United States Patent [19]
Kalkowski

[11] 3,809,281
[45] May 7, 1974

[54] UTENSIL HAVING STABILIZERS FOR PREVENTING SPRAYING WITH FRYING PANS, OR THE LIKE

[76] Inventor: Kurt-Ulrich Kalkowski, Am Bleiberg 3, 5351 Kommern, Germany

[22] Filed: Nov. 14, 1972

[21] Appl. No.: 306,194

[52] U.S. Cl............... 220/44 R, 55/384, 210/471, 220/24 R, D7/99, D7/131
[51] Int. Cl... B65d 51/16, B65d 51/00, B01d 35/00
[58] Field of Search........... 220/24 R, 44 R, 72, 19; 229/2.5, 3.5 M; 55/384, 525, 526; 210/470, 477, 471–475; D54/2 B; D13/1 M, 1 J; D7/131, 99

[56] References Cited
UNITED STATES PATENTS
3,301,404  1/1967  Becker.................. 210/470
3,679,088  7/1972  Swett et al............... 220/60 R
3,155,303  11/1964  Fenkel................... 229/2.5
829,477  8/1906  Kruse..................... 220/72

Primary Examiner—William I. Prince
Assistant Examiner—Allan N. Shoap
Attorney, Agent, or Firm—Burns, Doane, Swecker & Mathis

[57] ABSTRACT

A cover suitable for use with cooking containers to prevent the splattering of grease includes a handled frame carrying a mesh screen. The screen includes depressions which accommodate thermal expansion and contraction of the screen to resist the formation of permanent thermally induced deformations in the screen.

12 Claims, 6 Drawing Figures

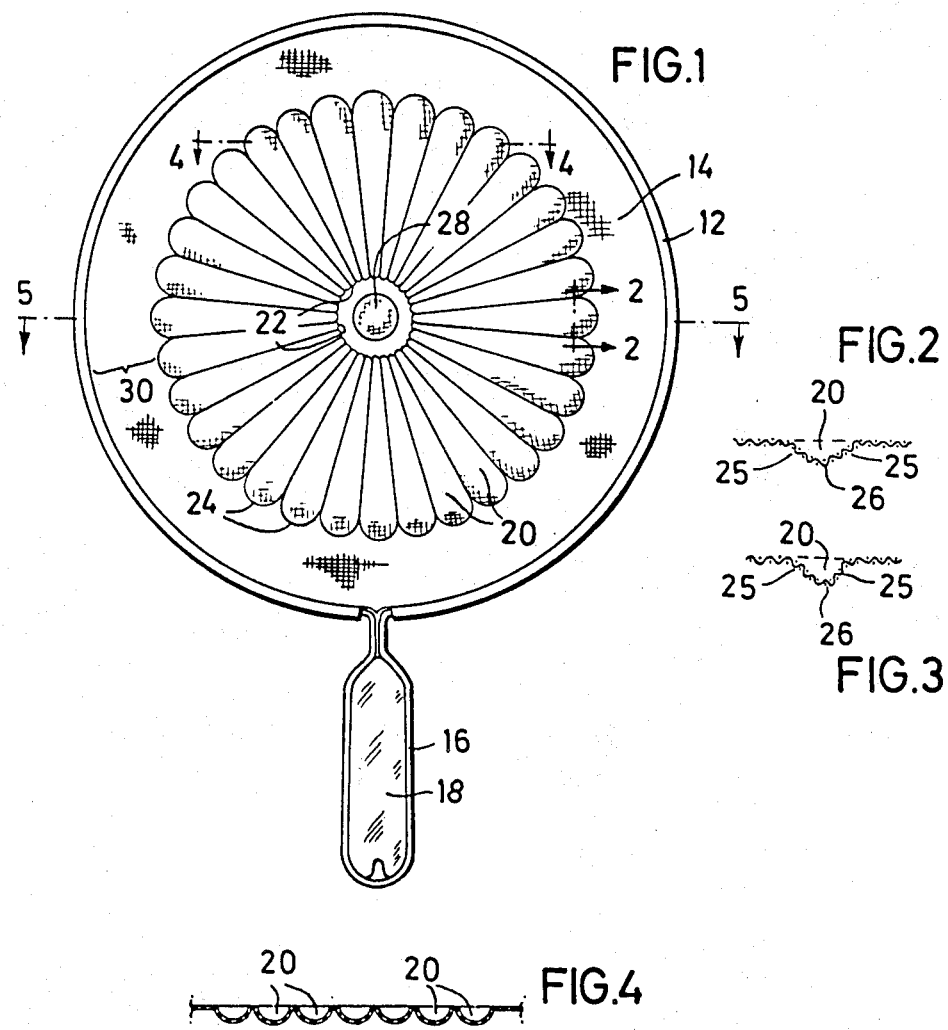

UTENSIL HAVING STABILIZERS FOR PREVENTING SPRAYING WITH FRYING PANS, OR THE LIKE

The invention relates to a utensil for preventing spraying with frying pans, or the like, consisting of a cover-plate, which can be placed over the pan or pot-rim, the cover-plate consisting of a wire-mesh, or a perforated metal-foil, which is supported within a rigid frame.

A utensil of that kind is known, in which the mesh-size and the wire-thickness of the wire-mesh are dimensioned such that the particles of fat, spayed upwardly when frying and cooking food-stuff, having a water content, are caught by the wire-mesh, whilst the evaporating water vapor and steam are able to pass the wire-mesh without hindrance. Therewith a steam trap is avoided, and no vapor is trapped within the frying vessel, which could influence the frying process.

In the case of the known utensil, the frame consists of a wire-ring, around which the rim of the wire-mesh is provided and having a sheet metal sleeve ring rolled about the wire-ring, attached thereto.

Experience has shown that the wire-mesh, or the similarly perforated metal-foil looses its tension by a longer use of the known utensil and is no longer planar between the frame, is considerably deformed and shows sagging. The reason for this is that the wire-mesh does not resist, without effect, to the temperature changes, influencing it when used. The wire-mesh is at the normal room-temperature of approximately 18° Celsius, when not used. In use over a frying vessel, it is exposed to temperatures of about 200°. Due to the fact that the utensil is taken away from the frying vessel repeatedly in the course of the frying process and is also brought into contact, eventually, with cold water, there are frequent and quickly occurring temperature changes. This causes gradual elongation and embrittlement of the wires forming the wire-mesh. Consequently, the functional value of the cover utensil for protection against spraying is decreased.

Based upon this prior art, a technical object of the present invention is to improve the known utensil in such a manner that the deformation and the sagging of the wire-mesh by a longer use are avoided and thus the operational value of the utensil is maintained for a practically endless period in technical respect as well as from a point of view of the outer appearance. In solving this object, it is to be started from the fact that same cannot be seen in the selection of a better material with a smaller coefficient of expansion for the wire-mesh, because the increased price resulting thereby, totally, would raise the price of the utensil too much. Therefore, the solution is to be found in a constructional measure which can simply be performed and which, notwithstanding, is efficient. Therefore, for the solution of the object as set, the present invention provides stabilizers within the wire-mesh. These stabilizers increase the moment of resistance and the modulus of elasticity of the wire-mesh in the direction of stressing and thus decrease the factor of expansion of the area. This direction of stressing is practically vertical to the plane of the wire-mesh. The resulting forces are formed by the specific weight of the wire-mesh, which sags under the influence of gravity due to the elongation of the wires. Additional forces are resulting from this deformation, which also contribute to the deformation. The stabilizers now stiffen the wire-mesh and counteract deformation and sagging.

It is necessary that the stabilizers do not influence the purpose of the wire-mesh, i.e., the catching of particles of fat, avoiding a steam trap or lock. The stabilizers are not allowed to extend over the whole surface of the wire-mesh. Thus the invention provides as expedient that the stabilizers extend starlike from the center of the wire-mesh to its periphery. Therewith a uniform sputtering results and a neutralization as well as a resolution of the forces effecting the sagging, or of the forces resulting therewith.

For reasons of simple manufacture and provision of the stabilizers, the invention provides a further measure that those are formed as depressions. In this form of depressions, the stabilizers, inter alia, fulfil the same objectives, which are solved in case of the use of sheet-metal parts by reinforcing beads. The depressions, or beads, increase the material cross-section in several stressing directions, i.e., in radial and tangential directions, and thus create increased moments of resistance against the deforming forces, resulting in these directions, whereby the crimping portions of the wire-mesh cooperate with the stabilizers in a particularly advantageous manner.

A uniform distribution of the stabilizers over the surface of the wire-mesh and a resolution of the forces results in such a case, if the longitudinal axes of the depressions, according to a further feature of the invention, extend in radial direction, and the cross or transverse axes of the depressions extend in circumferential direction. Therefore, the stabilizers, or depressions, show as a whole the configuration of a radiating star.

For providing the depressions in the wire-mesh, the invention proposes that these are pressed into the wire-mesh. The impression operation can be effected in a simple manner, as concerns economical manufacture. In the transistion range between the planar face of the wire-mesh and the depressions, the individual wires are deformed only within their limit of elasticity and thus are not influenced as to their strength. Sharp edges at the rims of the depressions should be avoided. However, the wires maintain the deformation worked into them, so that also the depressions pressed in maintain their shape.

In order to keep low the stressing of the individual wires during the deformation, occurring by the pressing operation, the invention provides that the depressions have the form of tubs with large transition radii between the area of the wire-mesh and their side-limbs on the one hand, and between their side-limbs and the bottom on the other hand. Thus sharp edges are avoided, which are not only difficult to manufacture, but also influence the wires as to the strength thereof. The tub-form with two side-limbs extending more or less vertically from the area of the wire-mesh results in the additional advantage, that the material present in both side-limbs increases the moment of resistance in the direction of stress, extending vertically to the area of the wire-mesh.

According to the generally provided circular shape of the cover utensil, the depressions also have a shape, adapted to this circular shape. The invention provides that the depressions at their ends disposed radially outwardly are wider than at the ends thereof disposed radially inwardly.

The dimensions of the depressions are variable, practically unlimited, in each direction and are scarcely subjected to any limitations. However, depressions proved suitable, the width of which is approximately 15 mm, and the depth of which is approximately 4 mm.

The known utensil, as described hereinbefore, has the advantage that it can be used with frying and cooking vessels of widely differing diameters. With a vessel of a large diameter, the utensil practically is placed over the rim of the vessel by its outer rim. In the case of a vessel of a smaller diameter the utensil is placed over the rim of the vessel with the range of its wire-mesh situated more inwardly. This advantage is to be maintained. In particular, the utensil according to the present invention is adapted to be used with so-called larger and so-called smaller frying pans, having standardized uniform sizes. For reaching such general applicability, the invention provides that the distance between the ends of the depressions, disposed radially outwardly, and the frame is approximately 30 mm. Accordingly a planar and approximately 30 mm wide rim area is maintained at the periphery of the cover utensil. It is essential that the surface of the face comprising the stabilizers is larger than the rim area that is free of stabilizers, in order to reach an optimum effect. Naturally, this rim area is completely planar on both sides thereof, so that the cover utensil can be placed over the vessel by its lower side as well as by its upper side (these expressions can be used arbitrarily). Thus the completely planar rim area is placed over the vessel rim in a close manner and without intermediate spaces.

In addition, the invention provides that the depressions with their ends radially extending inwardly, do not reach the center of the utensil, and that there is a boss-like projection which is pressed into the wire-mesh.

The utensil, as described hereinbefore, with the several embodiments thereof, provides the advantage, which has been already mentioned, that the wire-mesh is stabilized and hanging or sagging thereof is prevented. As one reason, the increase of the moment of resistance in the range of the depressions has been stated. However, there is another reason why the wire-mesh does not sag in spite of elongation of its wires. This reason is that the wire-mesh, having a circular shape, is divided into sectors by the depressions and each sector is to be considered as an area, being independent by itself. In case of lengthening or elongation of such a sector, same expands, inter alia, into circumferential direction, and this elongation is taken up by the depressions, now acting as buffer means. The upper edges of the depressions, or of the side-limbs, limiting the depressions, are slightly moved onto one another during the elongation. This moving or approaching is effected and reached in that the upper edges of the two side-limbs, limiting a depressions, are not connected together, and thus do not, practically, offer resistance to their inward movement.

Thus, to sum up, the stabilizers according to the present invention counteract deforming and sagging of the wire-mesh, caused by the material expansion of the warp and filling wires, in two different manners completing each other.

The invention will become more readily apparent from the following description, by way of example only, of one embodiment thereof, with reference to the accompanying drawings wherein:

FIG. 1 is a top view of a utensil provided according to the invention;

FIG. 2 is a section through the end of a depression, disposed radially outwardly, in the range of the section line 2 — 2 in FIG. 1;

FIG. 3 a section according to FIG. 2 at a point of time, after the material has expanded and has pressed together the upper edges of the side-limbs of the depression;

FIG. 4 is a section through the wire-mesh, showing three depressions in the range of the section line 4 — 4 in FIG. 1;

FIG. 5 is a longitudinal section through the wire-mesh, showing two complete depressions, and with the boss-like projection, arranged within the center, and FIG. 6 is a section through a frying pan and a utensil, placed over the rim thereof.

The utensil as a whole illustrated in FIG. 1, comprises the frame 12, the wire-mesh 14, supported within the frame 12 and clamped therein, the handle 16 with an insert 18, and the individual depressions 20, pressed into the wire-mesh 14. The depressions 20 have a smaller inner end 22 and a wider outer end 24. Both ends are rounded.

The section view shown in FIG. 2, through a depression 20 shows the side-limbs 25 thereof and the bottom 26 thereof. Furthermore, this section shows the large transition-radii between the planar area of the wire-mesh 14 and the two limbs 25, and at the transition between the limbs 25 and the bottom 26. Moreover, it can be seen that the width of the depression 20 continuously decreases from top to bottom.

FIG. 3 shows a similar section, with the exception that the depression is illustrated therein already in a somewhat compressed condition. The upper edges of the two side-limbs 25 have moved inwardly due to elongation of the wires of the wire-mesh and have approached towards one another. As has already been described, elongation is taken up thereby, and sagging and inconvenient deforming are avoided.

FIGS. 4 and 5 show sections at different portions of the wire-mesh 14. They demonstrate that the depressions 20, in a substantially complete manner, extend through the wire-mesh and thus reinforce same everywhere, and/or form compensating members for adjusting and taking up material elongation.

FIG. 6 shows a central section through a frying pan 32, having the cover utensil placed thereover. This section clearly shows the function of the rim portion 30, which is free of any depressions. Same is placed over the pan rim 34. Due to its extension in radial direction, it can be placed over pan-rims of pans of various diameters.

The section views according to FIGS. 4 to 6, additionally, show the boss-like projections 28, provided in the center and corresponding to the depressions 20 in the configuration thereof.

What is claimed is:

1. A cover for use with a cooking container and arranged to rest loosely atop the container to prevent the splashing of hot liquids from the container said cover comprising:

a support frame; and a wire mesh screen connected at its periphery to said support frame and being longitudinally expandable and contractible in response to temperature variations;

said screen being arranged to extend across a container opening to intercept hot liquids tending to splash outwardly therefrom;

said wire mesh screen including stabilizer regions comprising a plurality of depressions arranged to resist the formation of thermally-induced deformations in said wire mesh screen.

2. A cover in accordance with claim 1 wherein said frame is circular; said depressions extend radially and terminate short of said frame to define a substantially flat, support rim portion.

3. A cover in accordance with claim 1 wherein said deformations are arranged in a star-like pattern from the center of said wire mesh screen to adjacent the periphery thereof.

4. A cover in accordance with claim 3 wherein said depressions are disposed immediately adjacent one another in a circular pattern in said wire mesh screen.

5. A cover in accordance with claim 4 wherein said cover and said wire mesh screen are circular; the longitudinal axes of said depressions extend radially; and the transverse axes thereof extend generally tangentially.

6. A cover in accordance with claim 5 wherein said depressions are press-formed in said wire mesh screen.

7. A cover in accordance with claim 6 wherein said depressions are each configured as a tub having outwardly projecting side limbs; the junctures between said side limbs and the remainder of said wire mesh screen defining first transition curves; and the juncture between the outer ends of said side limbs defining a second transition curve.

8. A cover in accordance with claim 7 wherein said depressions are wider at their radial outer ends than at their radial inner ends.

9. A cover in accordance with claim 8 wherein said depressions each have a width of approximately 15 mm and a depth of approximately 4 mm.

10. A cover in accordance with claim 9 wherein the outer radial ends of said depressions are spaced approximately 30 mm from said frame.

11. A cover in accordance with claim 10 wherein the radial inner ends of said depressions terminate short of the center of said screen; the center of said screen being defined by a boss-like projection press-formed in said screen.

12. A cover for use with cooking containers for preventing the splashing of liquids from the containers; said cover comprising a circular frame; a handle projecting from said frame; a circular wire mesh screen connected at its outer periphery to said frame and disposed across the inner area defined by said frame; said screen including:

a plurality of immediately adjacent radially-extending depressions, the width of said depressions increasing in an outward radial direction;

said depressions terminating short of said frame to define a generally planar rim portion; and a circular depression formed radially inwardly of said depressions, wherein said depressions elastically accommodate thermal expansion and contraction of the screen to resist the formation of permanent deformations therein.

* * * * *